Aug. 13, 1957
D. T. ADAMS
2,802,706
PISTON SEAL
Filed Dec. 19, 1955
2 Sheets-Sheet 1
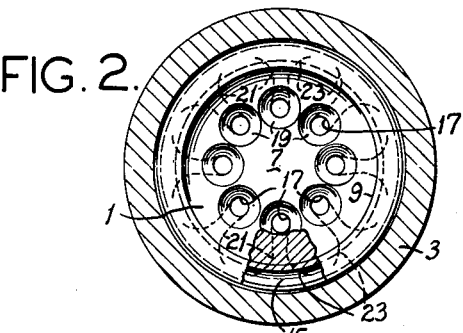
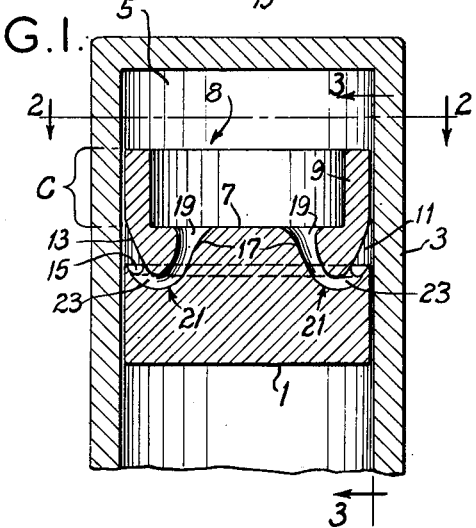
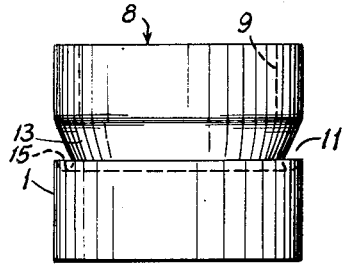
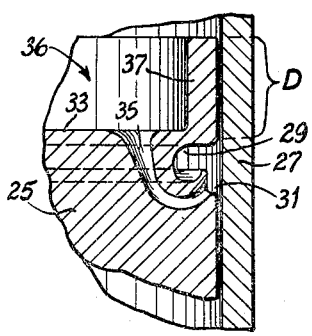
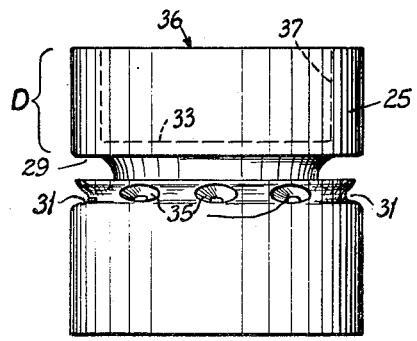
Donald T. Adams,
Inventor.
Koenig and Pope,
Attorneys.

Aug. 13, 1957 D. T. ADAMS 2,802,706
PISTON SEAL
Filed Dec. 19, 1955 2 Sheets-Sheet 2

Donald T. Adams,
Inventor.
Koenig and Pope,
Attorneys.

United States Patent Office 2,802,706
Patented Aug. 13, 1957

2,802,706
PISTON SEAL
Donald T. Adams, Arlington, Va.

Application December 19, 1955, Serial No. 553,365

20 Claims. (Cl. 309—4)

This invention relates to piston seals, and with regard to certain more specific features, to seals for pistons which are movable in cylinders containing rapidly pressurized operative gas or vapor.

Among the several objects of the invention may be noted the provision of a piston seal which, even with a comparatively large clearance between a piston and its containing cylinder, provides an effective gaseous seal, without the necessity for mechanical gas-sealing means between the piston and cylinder; and the provision of a piston seal of the class described which is effective in sealing against gases and vapors operating over an extensive range of pressures. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a diagrammatic axial section of a piston in a cylinder embodying one form of my invention;

Fig. 2 is a cross section taken on line 2—2 of Fig. 1, certain parts of the piston being broken away;

Fig. 3 is a side elevation of the piston, being viewed from line 3—3 on Fig. 1;

Fig. 4 is a fragmentary axial section showing a second embodiment of the invention;

Fig. 5 is a side elevation similar to Fig. 3 but showing the second embodiment;

Corresponding reference characters indicate corresponding parts throughout the several views of the drawings.

Figure 6:
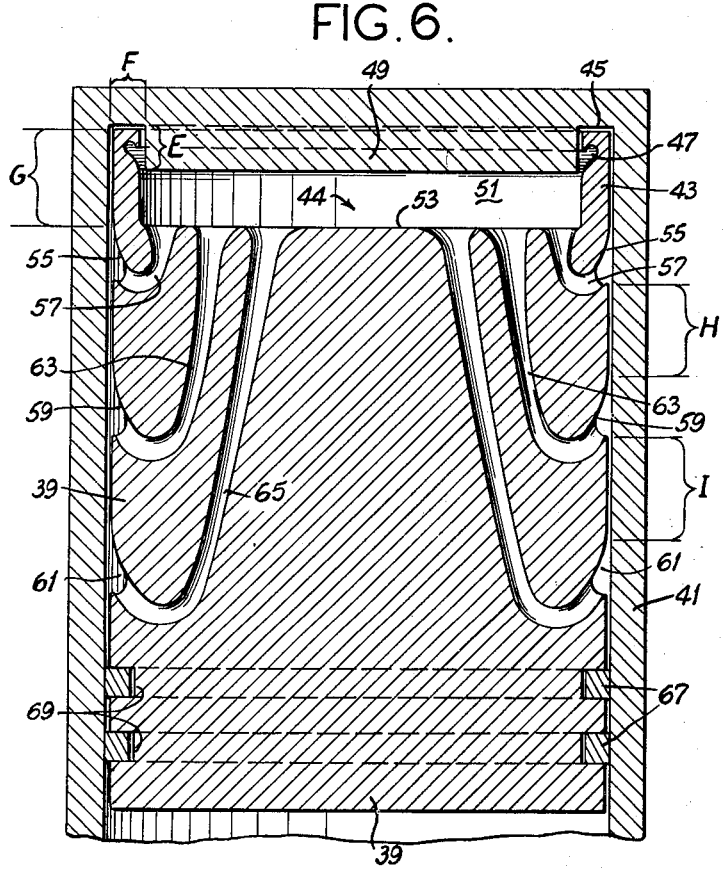
Fig. 6 is an axial section showing a third form of the invention.

The term piston as used hereinafter is defined as a sliding piece in a cylinder, propelled by or moving against rapidly engendered gaseous pressure, and includes various forms of engine pistons, plungers, projectiles, rocket launching devices, sabats and similar elements. The term gas as used herein includes vapor.

Various forms of ringless pistons have been suggested for sealing purposes but these have not attained any appreciable degree of success. By means of the present invention, the piston and certain passages therein are so arranged and shaped that gas flowing from the pressure chamber through the passages is directed into the clearance space in such a manner that leakage is prevented. This is effected by a suitably shaped piston and peripheral grooves therein fed by a number of individual nozzles which will produce a stream of gas around the entire periphery of the piston, the gas finally moving in a direction against the direction of potential leakage. The nozzles and grooves are so shaped that they will provide an excess of gas momentum over that of any possible gas leakage stream during the period that sealing is required.

Some of the nozzles employed in the invention, and to be described, are of the converging type. These are for relatively low gas pressures behind the piston. Others are of the converging-diverging type for relatively high gas pressures. The reason for this variation is that as a compressible fluid passes through a nozzle, drop in pressure takes place, with velocity increase. Assuming (as is the fact for rapid operations) that the flow through the nozzle is adiabatic, or approaches this condition, successive nozzle cross sections may be calculated from the gas properties, in order that the flowing gas will fill the provided space. This is known and requires a nozzle which must first converge. However, if the pressure difference through the nozzle is sufficient, a diverging nozzle section must be added in order to accommodate increased volume due to expansion; otherwise there will be a limit upon the amount of fluid which can pass the nozzle. Thus for every nozzle there is a critical flow pressure in its throat (minimum cross section) for a given inlet pressure. This determines the volume of gas which can pass. Decrease in outlet pressure down to the critical flow pressure results in increased flow; but any further decrease in outlet pressure below the critical flow pressure results in no further increase in flow. Thus as is known to increase the flow under such conditions, a diverging nozzle section is required. For so-called perfect gases in general, the ratio of critical flow pressure to inlet pressure is approximately 0.53, for saturated steam it is about 0.57, and for moderately super-heated steam it is about 0.55. Therefore, when these ratios are equalled or exceeded (i. e., comparatively low pressures being dealt with), converging nozzles are employed in the present invention; otherwise (i. e., below these ratios) the converging-diverging types are used.

Referring now more particularly to Figs. 1–3, there is shown at numeral 1 a typical piston in a typical cylinder 3. The cylinder 3 may be that of an internal combustion engine, steam engine, gun barrel, rocket launcher or the like. In the case of an engine, the piston may be connected with the usual crankshaft by means of a connecting rod, and in the case of a gun barrel, rocket launcher or the like, the piston may constitute the rear end of a projectile, rocket, sabat, or like launcher. The gas-pressure chamber is indexed 5. Around the head 7 of the piston is arranged a skirt 9 which produces a cup-shaped pressure-receiving end 8 on the piston. The interior of this cup is exposed to the pressure engendered in the gas.

A re-entrant groove 11 is formed around the periphery of the piston, for example near the base of the cup shape. This groove has a conical wall 13 ending in a re-entrant portion 15. The conical portion 13 converges in a direction away from the head of the piston 1 and is inwardly tangent to the re-entrant portion 15. The outer margin of the re-entrant portion is directed tangently toward the large end of the conical portion, which is to say, toward clearance length C through which potential leakage might occur past skirt 9.

Formed in the head 7 (i. e., bottom of cup 8) and peripherally distributed therein is a plurality of gas nozzles 17. These nozzles have convergent inlets 19 which in section taper down to throats at 21 and then, in the case of high pressures to be dealt with, diverge as shown at 23. The outlets are spaced around the re-entrant portion 15, so as to distribute the gas in a ring throughout the periphery of the piston. The re-entrant form of groove directs this ring of gas toward the clearance length C.

Operation of the form of the invention shown in Figs. 1–3 is as follows, assuming the rapid generation of high pressure in the chamber 5. Such a rapid increase in pressure may result, for example, when a combustible mixture such as hydrocarbon fuel and air or gun powder is ignited in the chamber, or when air, steam or other gaseous mixtures are rapidly admitted into the chamber, or when a gas or gaseous mixture is compressed therein as piston 1 moves upward by force applied through a piston rod or similar means.

At the beginning of a rapid pressure increase in the chamber 5, the pressure existing in the clearance space C, nozzles 17 and groove 11 will be that existing in the chamber 5 before the pressure increase. The volumes encompassed by the nozzles 17, clearance space C, and groove 11 will then for a short period of time provide a region into which gas may flow. Any gas that passes through the nozzles 11 will have some of its energy that existed in the form of temperature and pressure converted efficiently into kinetic energy of momentum. But any leakage of gas that tends to flow directly into the top of space C from chamber 5 does not occur under conditions conducive to the efficient production of kinetic energy of momentum. Thus the gas reaching the bottom of the clearance space C, which has been directed upward by the nozzles 17 and groove 11, rapidly attains a greater momentum than any stream of leakage gas which may start to flow downward through the clearance space C. The result is that the leakage flow is instantaneously resisted. The stated conditions are transient, since pressure equilibrium in a short time will be reached at the top and the bottom of the clearance space C. The time during which sealing is required is short, in view of the rapid motion of the piston in the cylinder, which is the usual case, or at least the case to which the invention is applicable. The skirt 9 shortens the nozzle lengths by having the inlets at the bottom of the cup shape 8 on the pressure side of the piston, and also extends the clearnace space or leakage path C. This arrangement favors increase of the sealing period. The reverse curvatures of the nozzles cause the gasses passing through them to have a reactive accelerating effect upon the piston.

From what has been said above, it will be apparent that, depending upon pressure reached in chamber 5, the nozzles employed may be of the converging-diverging type described in connection with Figs. 1-3, or of the converging type. The latter are referred to below in connection with another form of the invention.

The duration of the seal against leakage can be increased by increasing the volume of the groove. In Figs. 4 and 5 is shown an alternative form of the invention designed to accomplish this. In this case the piston 25 in cylinder 27 is provided with a main groove 29 of re-entrant form, below which is an auxiliary groove 31 connecting with the piston head 33 by means of a plurality of nozzles, shown at 35. In this case, by way of example, converging nozzles are shown for comparatively low-pressure applications. The skirt forming the cup 36 around the piston head is indexed 37. Nozzles 35 distributed around the bottom of the cup open into the groove 31 at intervals, and groove 31 opens continuously into the groove 29. The additional groove volume thus provided prolongs the action through the nozzles, and thus prolongs the sealing effect. The result is that the piston may be sealed for a greater length of travel. In this case the leakage path is indicated at D.

In Fig. 6 is shown another form of the invention for increasing the sealing period. In this case the piston 39 is shown in cylinder 41. The skirt 43 forming cup 44 on the piston head 53 reaches into a groove 45 formed in the cylinder head. A re-entrant groove 47 is formed within the skirt 43 around the part 49 of the cylinder head extending into the cup. The pressure chamber 51 is then located between this extension 49 and the piston head 53. Any leakage must follow a sinuous path around the margin of the skirt 43 in the groove 45. This delays leakage. Groove 55 is the counterpart of groove 11 in Fig. 1, and peripherally disposed nozzles 57 are counterparts of the nozzles 17. In addition, similar grooves 59 and 61 are used with a plurality of circularly disposed nozzles 63 reaching from the head 53 to groove 59 and a plurality of circularly disposed nozzles 65 reaching from head 53 into groove 61. Since the lengths of the nozzles 63 and 65 are successively greater, their gas-momentum-increasing actions into grooves 59 and 61, respectively, occur successively later than those through nozzles 57 in the groove 55. Thus at a period when static equilibrium may have been reached in groove 55, it has not been reached in groove 59; and when static equilibrium is reached in groove 59, it will not as yet have been reached in groove 61.

Fig. 6 also illustrates that the invention can be used with piston rings such as shown at 67 in piston grooves 69. For example, such rings may be desired for oil control purposes or for sealing at the outer end of the piston travel after the sealing action according to the invention has ended (in the case of expansion of the gas on the piston), or before sealing action according to the invention has started (in the case of gas compression by the piston).

It will be observed that in Fig. 6, the initial leakage path length is the sum of the dimensions E, F, G and additional leakage paths are indexed H, I the latter coming into action in accordance with progressive piston movement. It will be understood that in some instances the re-entrant groove 47 may be omitted from the skirt 43, or that it or additional ones may be placed on the outside of the skirt but inverted for proper re-entrant relation to leakage.

Figure 7:
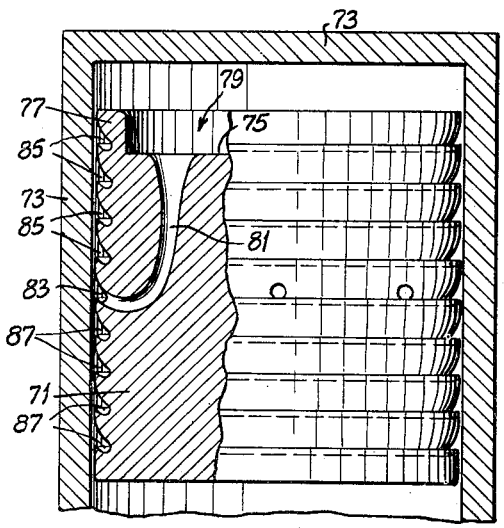
Fig. 7 is a side elevation partly in section, showing a fourth form of the invention.

Fig. 7 illustrates another form of the invention in which a single ring of nozzles is used, leading to a re-entrant groove in the piston flanked by additional re-entrant grooves which function as eddy producing labyrinths. In this case, numeral 71 designates the piston in cylinder 73, having the head 75 surrounded by skirt 77 providing the cup 79. The nozzles are indicated at 81, these being of the converging type for comparatively low pressure operations, no diverging sections being used. These nozzles lead to a re-entrant groove 83. The function of the nozzles 81 and groove 83 is similar to that already described and requires no further elaboration. In this case an additional set of re-entrant labyrinth grooves 85 is provided around the piston between its skirt and groove 83. These serve to slow down the rate at which balanced pressure will be reached in groove 83 because of the friction induced by eddy currents formed therein when gas flows over them. (The same is true of the groove 47 in Fig. 6.) Below the groove 83 in Fig. 7 are additional labyrinth grooves 87 which also frictionally delay any leakage which may tend to occur downward and outward from the groove 83 after balanced pressure conditions have occurred therein.

In the foregoing, the terms downward and upward have been used in connection with the positions of parts shown in the drawings, but it will be understood that the apparatus will function at any otherwise suitable angle.

The term re-entrant as used herein in describing any of the grooves means that the groove is of unsymmetrical cross section so arranged that any flow of gas thereover is met by a maximum frictional resistance by reason of a tendency to slide into, and then eddy in, the groove against the direction of entrance into the groove.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Sealing means operative between a cylinder and a piston slidable therein, said piston having a transverse pressure-receiving head; comprising an exterior groove around the piston and a plurality of nozzles having generally axially directed inlets spacedly disposed in and around the piston head and connecting with said groove, each nozzle gradually converging from its axial entrance in the piston head to a throat and being gradually curved from the generally axial direction at its inlet to a substantially different direction of entrance into said groove.

2. Sealing means according to claim 1, wherein each nozzle also diverges from its throat to its connection with said groove.

3. Sealing means according to claim 1 wherein the groove around the piston is re-entrantly shaped with respect to any possible leakage flow from the head of the piston.

4. Sealing means according to claim 1, wherein the curvature of each nozzle is of such an amount that the direction at the nozzle inlet is generally opposite to the general direction at its outlet in said groove.

5. Sealing means according to claim 4, wherein each nozzle also diverges from its throat to its connection with said groove.

6. Sealing means according to claim 1, including a skirt around the head of the piston providing an internal cup of which the piston head is the bottom, said skirt also forming with the cylinder a leakage path external to the cup, said groove around the piston being re-entrantly shaped with regard to said leakage path.

7. Sealing means according to claim 6 wherein the curvature of each nozzle is from the one generally axial direction at its inlet toward a generally opposite direction at its outlet in said groove.

8. Sealing means according to claim 6, wherein said nozzles are in cross section also gradually divergent from their throats to their entrances at said groove.

9. Sealing means according to claim 4, including at least one auxiliary groove directly connected peripherally with said other groove.

10. Sealing means according to claim 6, including at least one additional groove located between said groove and the head.

11. Sealing means according to claim 4, including a plurality of grooves located between the first-named groove and the head.

12. Sealing means according to claim 6, wherein said cylinder has a head containing an axial groove adapted to receive the margin of said skirt.

13. Sealing means according to claim 12, wherein the margin of said skirt which is accepted in said groove in the cylinder head is provided with a groove which is re-entrant relative to leakage around the skirt.

14. Sealing means operative between a cylinder and a piston slidable therein, comprising a skirt around the margin of the piston head providing an internal cup of which the piston head is the bottom, said skirt also forming with the cylinder a leakage path external to the cup, a plurality of grooves around the piston on one side of its head and re-entrantly shaped with regard to said leakage path, and peripherally disposed groups of nozzles respectively connecting said cup with the respective grooves.

15. Sealing means operative between a cylinder and a piston slidable therein, said piston having a head; comprising a plurality of grooves around the piston re-entrantly shaped with respect to the piston head and located on one side thereof, groups of nozzles respectively connecting said piston head with the respective grooves, the inlets of said nozzles being in said head.

16. Sealing means according to claim 15, wherein each nozzle has a converging portion leading from its inlet at the head and is curved from one general direction at its inlet toward the opposite general direction at its outlet in its groove.

17. Sealing means operative between a cylinder and a piston slidable therein, said piston having a pressure-receiving head; comprising a plurality of grooves around the piston and progressively spaced from its head, and groups of nozzles having inlets disposed in said head, the respective groups of nozzles connecting their respective inlets with the respective grooves.

18. Sealing means operative between a cylinder and a piston slidable therein, said piston having a pressure-receiving portion; comprising an exterior groove around the piston and a plurality of nozzles connecting said pressure-receiving portion with said groove, each nozzle having a gradual and continuous convergence from its inlet to a minimum throat portion adapted to increase the momentum of gaseous material in passing through the nozzle to reach the groove.

19. Sealing means made according to claim 18, wherein each nozzle also has a gradual and continuous divergence from said throat portion and extending to the groove.

20. Sealing means made according to claim 19, wherein said groove is of re-entrant shape with respect to any leakage flow through any clearance between the piston and the cylinder.

References Cited in the file of this patent

UNITED STATES PATENTS

| | | |
|---|---|---|
| 268,684 | Jones | Dec. 5, 1882 |
| 1,754,625 | Henning et al. | Apr. 15, 1930 |

FOREIGN PATENTS

| | | |
|---|---|---|
| 1,044,103 | France | June 17, 1953 |